United States Patent
Mayer, III et al.

(10) Patent No.: US 6,483,537 B1
(45) Date of Patent: Nov. 19, 2002

(54) APPARATUS AND METHOD FOR ANALYZING PROJECTED IMAGES, SINGLY AND FOR ARRAY PROJECTION APPLICATIONS

(75) Inventors: Theodore Mayer, III, Shadow Hills; Peter J. Inova, Glendale, both of CA (US)

(73) Assignee: Metavision Corporation, Burbank, CA (US)

(*) Notice: Subject to any disclaimer, the term of this patent is extended or adjusted under 35 U.S.C. 154(b) by 0 days.

(21) Appl. No.: 09/083,701

(22) Filed: May 21, 1998

Related U.S. Application Data (60) Provisional application No. 60/047,258, filed on May 21, 1997.

(51) Int. Cl.[7] .................. H04N 3/22; H04N 9/73; H04N 17/00
(52) U.S. Cl. .................. 348/180; 348/190; 348/191; 348/658; 348/745
(58) Field of Search ................... 348/190, 191, 348/657, 658, 745, 746, 747, 180; H04N 17/00, 9/73, 3/22, 3/23, 3/26

(56) References Cited

U.S. PATENT DOCUMENTS

| | | |
|---|---|---|
| 3,833,764 A | 9/1974 | Taylor |
| 4,103,435 A | 8/1978 | Herndon |
| 4,322,741 A | 3/1982 | Kawabayashi |
| 4,345,817 A | 8/1982 | Gwynn |
| 4,355,328 A | 10/1982 | Kulik |

(List continued on next page.)

FOREIGN PATENT DOCUMENTS

| | | |
|---|---|---|
| JP | 195984 | 8/1987 |
| JP | 64-27374 A | 1/1989 |
| JP | 228180 | 9/1990 |
| JP | 116088 | 5/1991 |
| JP | 3-245678 | 11/1991 |
| JP | 03-245687 | * 11/1991 |

OTHER PUBLICATIONS

Green, Mark et al., "A New Computer–Human Interface for Aligning and Edge Matching Multichannel Projector Systems," SID 88 Digest, pp. 109–112, Society for Information Display, Playa del Rey, California, May 1988.

(List continued on next page.)

Primary Examiner—John Miller
Assistant Examiner—Brian Yenke
(74) Attorney, Agent, or Firm—Christie, Parker & Hale, LLP (57) ABSTRACT

An apparatus and method for analyzing the brightness characteristics of a projected image and using the analyzed characteristics to improve the appearance of the projected image is disclosed. In one embodiment of the invention, the brightness characteristics of the projected image are analyzed at selected points across the raster of the image. An analysis array or array of data elements including brightness components corresponding to detail elements is then generated. The data elements in the array are then used to create compensation signals that are applied to the projected image through, for example, an overlay of smoothing factors or generation of a smoothing curve, to enhance the quality or appearance of the image by improving the regularity of brightness in all areas of the image. This regularity of brightness across the full span of the image is useful as a general improvement to the image and as a compensation for projector or projection surface brightness anomalies. In arrayed projection applications, central hot spotting, edge vignetting, electron beam or light source misalignments all can detract from evenly displayed images and all can benefit from the application of compensation that depends on an analysis array of the projected image.

18 Claims, 7 Drawing Sheets

U.S. PATENT DOCUMENTS

| | | | |
|---|---|---|---|
| 4,386,345 A | | 5/1983 | Narveson et al. |
| 4,468,693 A | | 8/1984 | Fujita et al. |
| 4,645,319 A | | 2/1987 | Fekete |
| 4,687,973 A | | 8/1987 | Holmes et al. |
| 4,739,396 A | | 4/1988 | Hyatt |
| 4,754,332 A | * | 6/1988 | Bergquist .................. 348/576 |
| 4,797,942 A | | 1/1989 | Burt |
| 4,799,000 A | | 1/1989 | Close |
| 4,839,720 A | | 6/1989 | Isnardi |
| 4,974,073 A | | 11/1990 | Inova |
| 4,999,703 A | | 3/1991 | Henderson |
| RE33,973 E | * | 6/1992 | Kriz et al. .................. 358/244 |
| 5,136,390 A | * | 8/1992 | Inova et al. ............... 358/231 |
| 5,200,815 A | * | 4/1993 | Tsujihara et al. ............ 358/10 |
| 5,231,481 A | * | 7/1993 | Eouzan et al. ............. 348/658 |
| 5,315,378 A | * | 5/1994 | Satou et al. ................ 348/181 |
| 5,335,082 A | | 8/1994 | Sable |
| 5,361,078 A | | 11/1994 | Caine |
| 5,384,912 A | | 1/1995 | Orginc et al. |
| 5,446,479 A | | 8/1995 | Thompson et al. |
| 5,475,447 A | * | 12/1995 | Funado ....................... 348/745 |
| 5,487,665 A | | 1/1996 | Lechner et al. |
| 5,495,576 A | | 2/1996 | Ritchey |
| 5,526,051 A | | 6/1996 | Gove et al. |
| 5,532,764 A | * | 7/1996 | Itaki .......................... 348/745 |
| 5,703,621 A | | 12/1997 | Martin et al. |
| 5,742,698 A | * | 4/1998 | Minami et al. ............. 382/100 |
| 5,771,072 A | | 6/1998 | Tokoro et al. |
| 5,828,410 A | | 10/1998 | Drapeau |
| 5,838,396 A | * | 11/1998 | Shiota et al. ............... 348/745 |
| 5,872,593 A | * | 2/1999 | Kawashima ................ 348/181 |
| 5,883,476 A | * | 3/1999 | Noguchi et al. ............ 348/181 |
| 6,018,361 A | * | 1/2000 | Fujii et al. .................. 348/180 |
| 6,020,919 A | * | 2/2000 | Fujii et al. .................. 348/190 |
| 6,061,102 A | * | 5/2000 | Sheppard et al. ........... 348/745 |
| 6,075,567 A | * | 6/2000 | Ohnishi ...................... 348/564 |
| 6,115,022 A | * | 9/2000 | Mayer, III et al. .......... 348/383 |
| 6,118,493 A | * | 9/2000 | Duhault et al. ............. 348/564 |
| 6,219,011 B1 | | 4/2001 | Aloni et al. |
| 6,219,099 B1 | | 4/2001 | Johnson et al. |
| 6,222,593 B1 | | 4/2001 | Higurashi et al. |
| 6,337,724 B1 | | 1/2002 | Itoh et al. |
| 6,340,976 B1 | | 1/2002 | Oguchi et al. |

OTHER PUBLICATIONS

Richards, Gerald P., "Digital Geometry Correction in Cursive CRT Displays," SID 86 Digest, pp. 360–361, 1986.

Cowdrey, D.A., "Advanced Visuals in Mission Simulators," AGARD Flight Mechanics Panel Symposium on Flight Simulation, pp. 1–10, Cambridge, 1985.

Fisher, Robert A. et al., "A Full–Field–Of–View Dome Visual Display For Tactical Combat Training," Proceedings of the Image IV Conference, Phoenix, Arizona, pp. 142–150, Jun. 23–26, 1987.

Freeman, Ken et al., "A 1249–Line High–Fidelity Color–TV Projector," SID 82 Digest, pp. 116–117, 1982.

Couturier, Alain, "Multipurpose High–Resolution Projector for Flight Simulator," Proceedings of the Image IV Conference, pp. 102–111, Phoenix, Arizona, Jun. 23–26, 1987.

Holmes, Richard E., "Large Screen Color CRT Projection System with Digital Correction," Large Screen Projection Displays., pp. 16–21, SPIE, vol. 760, 1987.

Holmes, Richard E., "Digital Remote Control for Matrixed Simulator Visual Displays," Proceedings of the Image IV Conference, Phoenix, Arizona, pp. 152–160, Jun. 23–26, 1987.

Holmes, Richard E., "Common Projector and Display Modules for Aircraft Simulator Visual Systems," Presented at the Image V Conference, Phoenix, Arizona, pp. 80–88, Jun. 19–22, 1990.

CompactView X10, "Digital Geometry Corrected Projector," 3D Perception, pp. 1–4.

CompactControl, "Set–Up and Support Tool for Compact-View X10 Projector and CompactU™," Version 3, 3D Perception, pp. 1–2.

CompactU™, "Digital Geometry and Soft Edge Correction Machine," 3D Perception, pp. 1–2.

CompactDesigner, "Design Tool for Projection Theaters," Version 3, 3D Perception, pp. 1–2.

CompactDesigner, "Software Package," 3D Perception, pp. 1–2.

Spooner, Michael Dr., "The Trend Towards Area of Interest in Visual Simulation Technology," Proceedings of the $4^{th}$ Interservice/Industry Training Equipment Conference, AAD122 155, vol. 1, pp. 205–213, Nov. 16–18, 1982.

Basinger, James D. et al., "The Technical Contributions of the Tactical Combat Trainer Development Program," Proceedings of the $4^{th}$ Interservice/Industry Training Equipment Conference, AD–A122 155, vol. 1, pp. 217–230, Nov. 16–18, 1982.

Lyon, Paul, "A Wide Field–Of–View CRT Projection System with Optical Feedback for Self Alignment," Proceedings of the $5^{th}$ Interservice/Industry Training Equipment Conference, AD–A142, vol. 1, pp. 1–9, Washington, D.C., Nov. 14–16, 1983.

Lyon, Paul et al., "A Self–Aligning CRT Projection System with Digital Correction," SID 84 Digest, pp. 108–111, Palisades Institute for Research Services, Inc., New York, New York, Jun. 1984.

Lyon, Paul, "Edge–Blending Multiple Projection Displays on a Dome Surface to Form Continuous Wide Angle Fields–Of–View," Proceedings of the $7^{th}$ Interservice/Industry Training, Simulation Education Conference, pp. 203–209, 1985.

Monroe, Eric G. et al., "CIG Edge Conservation Evaluation and Application to Visual Flight Simulation," Proceedings of the $10^{th}$ Naval Training Equipment Center/Industry Conference, pp. 203–209, Nov. 15–17, 1977.

Gardener, Geoffrey Dr., "Computer–Generated Texturing to Model Real–World Features," Proceedings of the $1^{st}$ Interservice/Industry Training, Simulation Education Conference,, pp. 239–245/246, 1979.

Hebb, Richard C., "Computer Program for Distortion Analysis in Spherical Screen Displays," proceedings of the $3^{rd}$ Interservice/Industry Training, Simulation Education Conference,, pp. 19–28, 1981.

Wyckoff, Bradley E., "Managing Cost/Performance Tradeoffs for Successful Visual Training," Proceedings of the $11^{th}$ Interservice/Industry Training, Simulation Education Conference, pp. 471–477, 1989.

Benion, Stephen, "Digital Processing of 3–D Data to Generate Interactive Real–Time Dynamic Pictures," Proceedings of the Society of Photo–Optical Instrumentation Engineers in Conjunction with The IEEE Computer Society International Optical Computing Conference, Three Dimensional Engineering, vol. 120, pp. 52–61, San Diego, California, Aug. 25–26, 1977.

Leavy, Wayne P., et al., "Closing the Gap Between Aircraft and Simulator Training With Limited Field–Of–View Visual Systems," proceedings of the 5th Interservice/Industry Training Equipment Conference, AD–A142 774, vol. 1, pp. 10–18, Washington D.C., Nov. 14–16, 1983.

Page, J. et al., "Advanced Raster/Calligraphic CRT Projector," Proceedings of the 12th Interservice/Industry Training Systems–Conference, pp. 286–294, Orlando Florida, Nov. 1990.

Latham, Roy, "Image Generator Architectures and Features," Proceedings of the 5th Interservice/Industry Training Equipment Conference, AD–A142 774, vol. 1, pp. 19–26, Washington, D.C., Nov. 14–16, 1983.

Lyon, Paul, "A New CRT Projector With Isotropic Edge–Blending and Digital Convergence," Proceedings of the 13th Interservice/Industry Training Systems Conference, Orlando, Florida, pp. 278–283, Dec. 1991.

* cited by examiner

APPARATUS AND METHOD FOR ANALYZING PROJECTED IMAGES, SINGLY AND FOR ARRAY PROJECTION APPLICATIONS

CROSS-REFERENCE TO RELATED APPLICATIONS

This application claims the benefit of U.S. provisional patent application No. 60/047,258, filed May 21, 1997, the contents of which are hereby incorporated by reference.

FIELD OF THE INVENTION

The present invention relates to an analyzer and feedback device and method for enhancing the quality and appearance of the projected image.

BACKGROUND OF THE INVENTION

Devices and methods for manipulating the brightness of an image are known. Examples of such systems include the one disclosed in U.S. Pat. No. 5,136,390 ("the '390 patent"), the contents of which are incorporated herein by reference. The system in that patent allows the brightness of an image to be precisely adjusted from detail element to detail element across an entire video image. Coarse adjustments can be made to parameters of the brightness ramping curve, while fine adjustments can be made for specific detail elements to correct artifacts generated by the video components.

In one embodiment, the system disclosed in the '390 patent encompasses a method for smoothing the brightness of two adjoining overlapping video images produced from two discrete video signals which each have a plurality of detail elements each with a brightness component. The method comprises applying a predetermined set of smoothing factors to the brightness components of the detail elements of the two signals, projecting the images as modified by the smoothing factors onto a display, modifying selected smoothing factors in response to the appearance of the projected display, and, finally, storing a representation of the smoothing factor modifications.

Utilizing the features disclosed therein, the system of the '390 patent enables a seamless multiple video image display to appear more consistent and uniform in brightness than a conventional single video image display. As a result, it is useful not only for displays with multiple overlapping video images, but also for smoothing the brightness of a single video image.

It some applications, it may be desirable to have a system in which the projected image is analyzed, and an array created of the brightness components of the projected image. The data in the array can then be used to automatically or manually modify selected smoothing factors in response to the appearance of the projected display, thereby enhancing the quality and appearance of the projected image.

SUMMARY OF THE INVENTION

There is therefore provided according to a presently preferred embodiment of the present invention, an apparatus and method for analyzing the brightness characteristics of a projected image and using the analyzed characteristics to improve the appearance of the projected image. In one embodiment of the invention, the brightness characteristics of the projected image are analyzed at selected points across the raster of the image. An analysis array or array of data elements including brightness components corresponding to detail elements is then generated. The data elements in the array are then used to create compensation signals that are applied to the projected image through, for example, an overlay of smoothing factors as described in the '390 patent, to enhance the quality or appearance of the image by improving the regularity of brightness in all areas of the image. This regularity of brightness across the full span of the image is useful as a general improvement to the image and as a compensation for projector or projection surface brightness anomalies. In arrayed projection applications, central hot spotting, edge vignetting, electron beam or light source misalignments all can detract from evenly displayed images and all can benefit from the application of compensation that depends on an analysis array of the projected image.

DESCRIPTION OF THE DRAWINGS

These and other features of the present invention will be better understood in light of the following detailed description read in conjunction with the accompanying drawings, wherein.

DETAILED DESCRIPTION OF THE INVENTION

Figure 1:
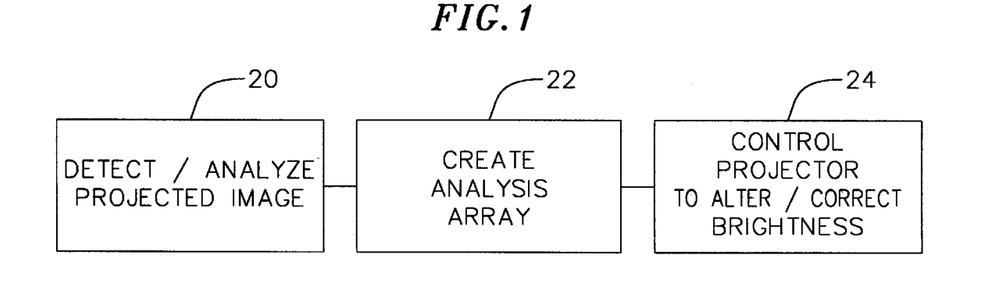
FIG. 1 is a general block diagram of an exemplary system according to the present invention that utilizes an analyzer and feedback device and method for improving the appearance of a projected image.

Referring to FIG. 1, the present invention generally involves detecting and analyzing a projected image on a screen (block 20), creating an analysis array based on the analyzed image (block 22) and controlling a projector or other image producing device to alter the brightness of the projected image as a function of the data in the analysis array (block 24). In practice, the brightness components of the projected image may be detected using any one of a number of suitable techniques. The analysis array includes data elements including readings of brightness from specific geometrically defined areas of the projected image. The data elements in the array can then be used to derive smoothing factors to alter the brightness of the image projected on the screen to enhance the appearance of the projected image.

Figure 2:
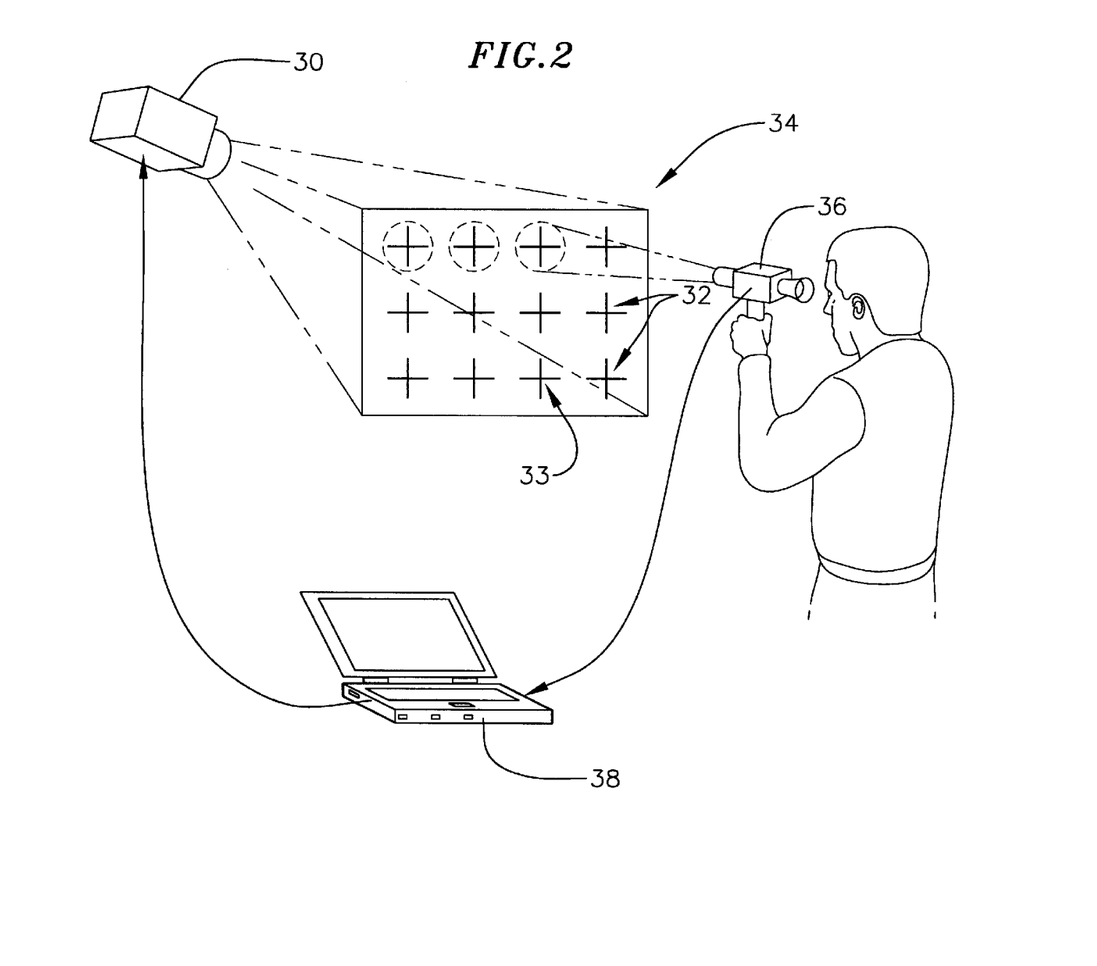
FIG. 2 is a diagram of a system utilizing a spotmeter to analyze the projected image according to one embodiment of the present invention.

Referring to FIG. 2, a system according to one embodiment of the present invention includes a projector 30 and computer 38 for throwing a grid pattern 32 of individual grid items 33 on to the projected image 34. A spot meter 36 is aligned with the grid. The spot meter can be manually or automatically adjusted to read and record the brightness of the image on each of the grid items. In operation, the grid is displayed, the meter centered on the appropriate grid item and the image is then replaced by the desired content for analysis, typically a solid color or luminance large enough to fill the acceptance angle of the meter. The actual analysis at individual sampling points is preferably by light sensitive metering in each color channel of the projected image. The detected brightness components from the spot meter are sequentially loaded into a computer 38 for generating the data elements of the analysis array for the image. Once accomplished, the next grid item is targeted until the analysis of each of the grid items is completed.

Figure 3A:
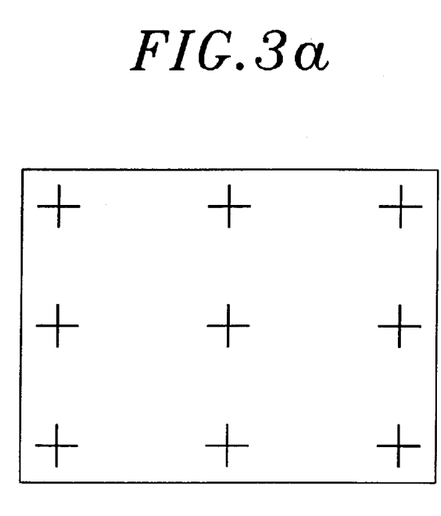
FIGS. 3a–c illustrate three different arrangements of targeted sampling areas for analysis by light sensitive devices for the purpose of creating an analysis array of projector brightness characteristics as delivered to the projection screen.
Figure 3B:
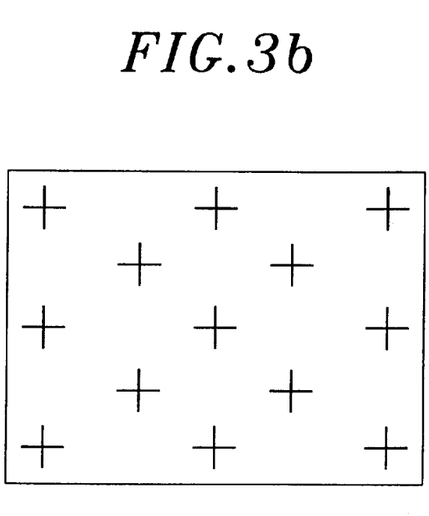
Figure 3C:
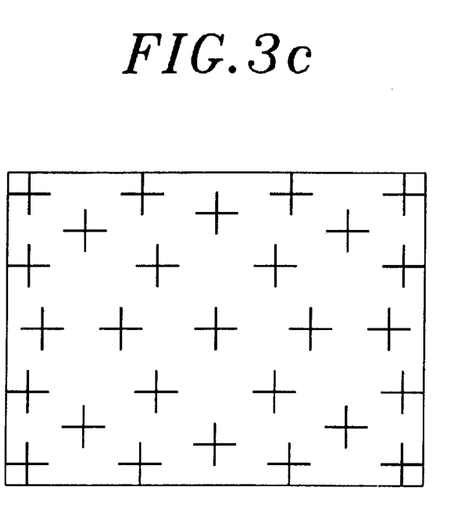

Referring to FIGS. 3a–c, various grid patterns are shown to facilitate accurate detection of brightness components across the image for creation of the analysis array. The illustration shows a typical 3:4 aspect image with differing sampling points indicated. In FIG. 3a, for example, there are three evenly spaced grid items across the top of the image, three across the middle of the image, and another three across the bottom of the image. This type of pattern can be used for a coarse brightness adjustment. In FIG. 3b, four more points are added to that so instead of nine grid items, there are 13 grid items and corresponding spots being read. In FIG. 3c, there are four grid items projected across the top of the image, four across the upper mid-portion, five across the center, four across the lower mid-portion and so on. Each type of grid pattern accordingly creates a different number of sample and detail points. It will be understood that the sample points may be laid out on a x/y grid across the projection raster as shown or may follow other geometries. More numerous sampling points may be accessed by the analyzer up to the highest resolution of the display.

Figure 4:
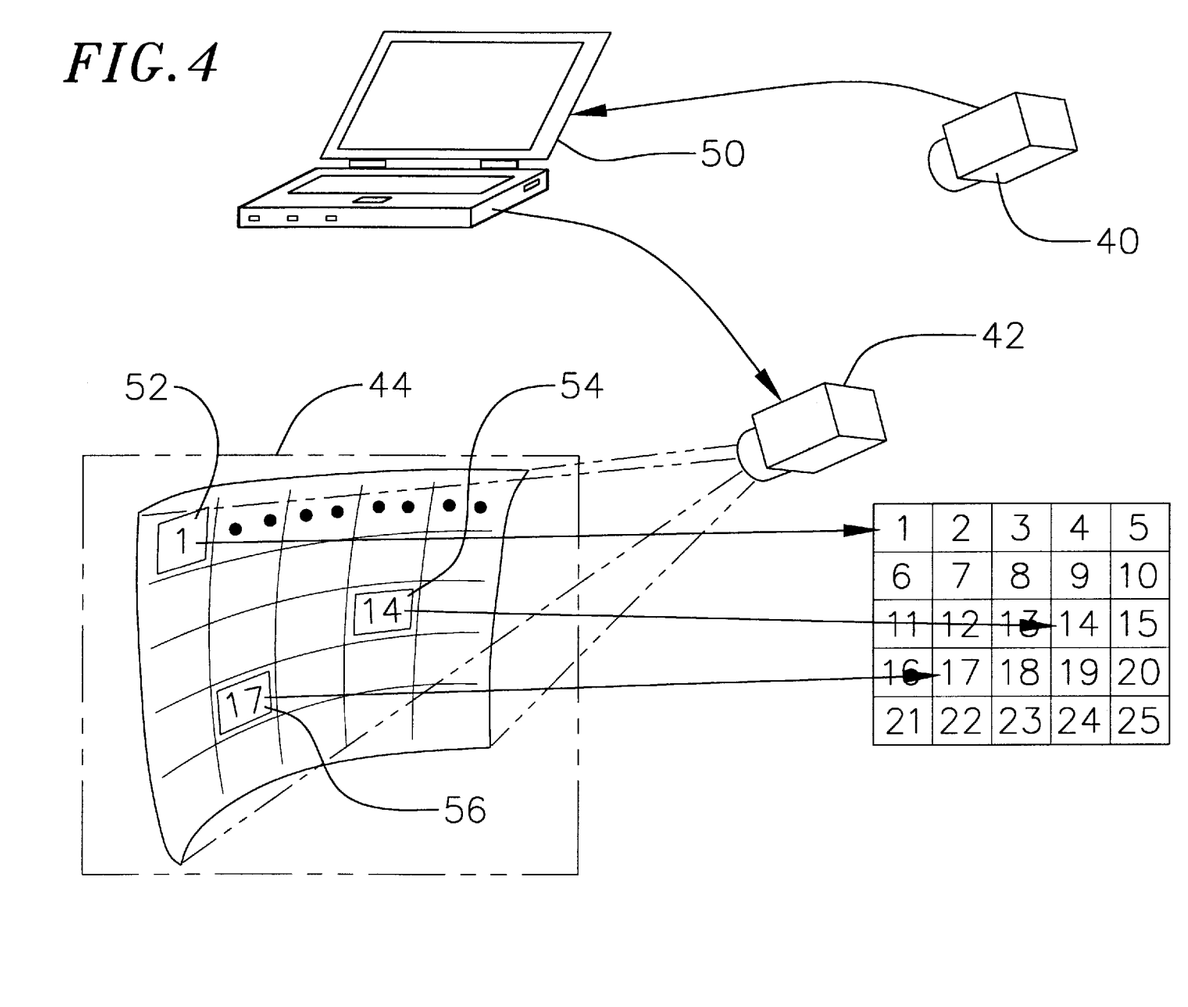
FIGS. 4 and 4a are diagrams of a system utilizing a CCD camera to analyze the projected image according to another embodiment of the present invention.

Referring to FIG. 4, another method for analyzing the projected image involves coordinating a camera-like sensor with the full raster of the display. In this embodiment, it is also possible to put the camera arbitrarily anywhere that it could view the entire raster. The observing sensor, preferably a CCD imaging array sensor in a sensitive video camera 40, is focused on the projected image from the projector 42 and geometric discrepancies are resolved by suitable process for any size, parallax, skew, curvilinear distortion or keystoning (trapezoidal distortion) by remapping elements of the camera image 44 to corresponding x/y analysis array registers. In this application, the CCD camera is considered to be an x/y array of individual light sensors. The camera's automatic gain, contrast, brightness and gamma circuits are adjusted to report absolute sensitivity to light. The result is that the geometric regularity of the original raster and the x/y analysis array are coordinated in spite of graphic distortions of the projected raster as perceived by the CCD.

Figure 4A:
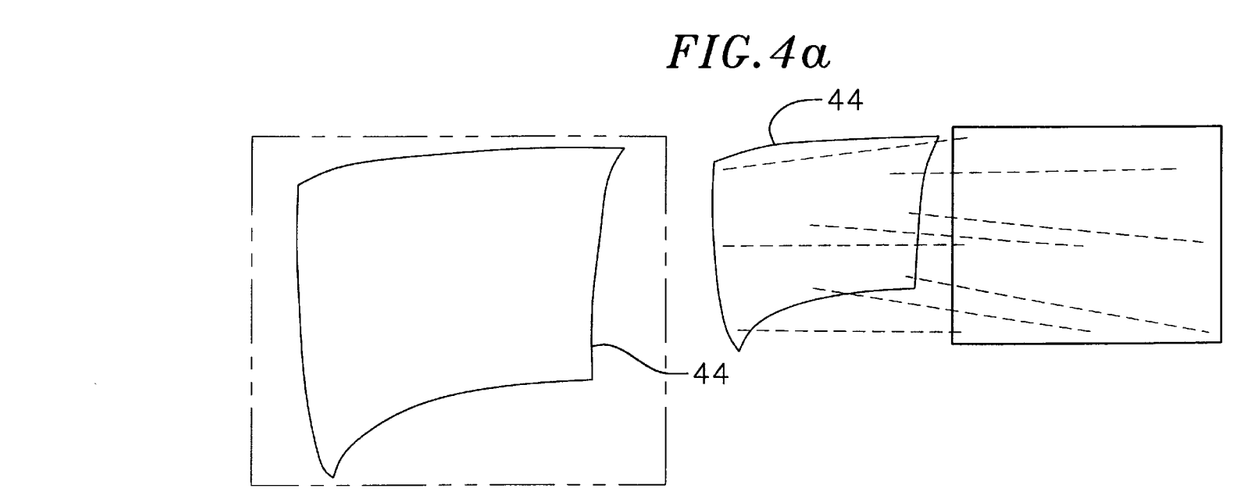

As shown in FIG. 4a, the camera image 44 shown on the monitor 46 is quite distorted. This may occur, for example, because the projected image may be on a curved surface and the CCD camera off to the side at an oblique angle. As such, the camera image would see the screen in perspective including its curvilinear distortion. On a rectangular representation of the array, each point on the image corresponds to a point on the rectangular array.

Figure 5:
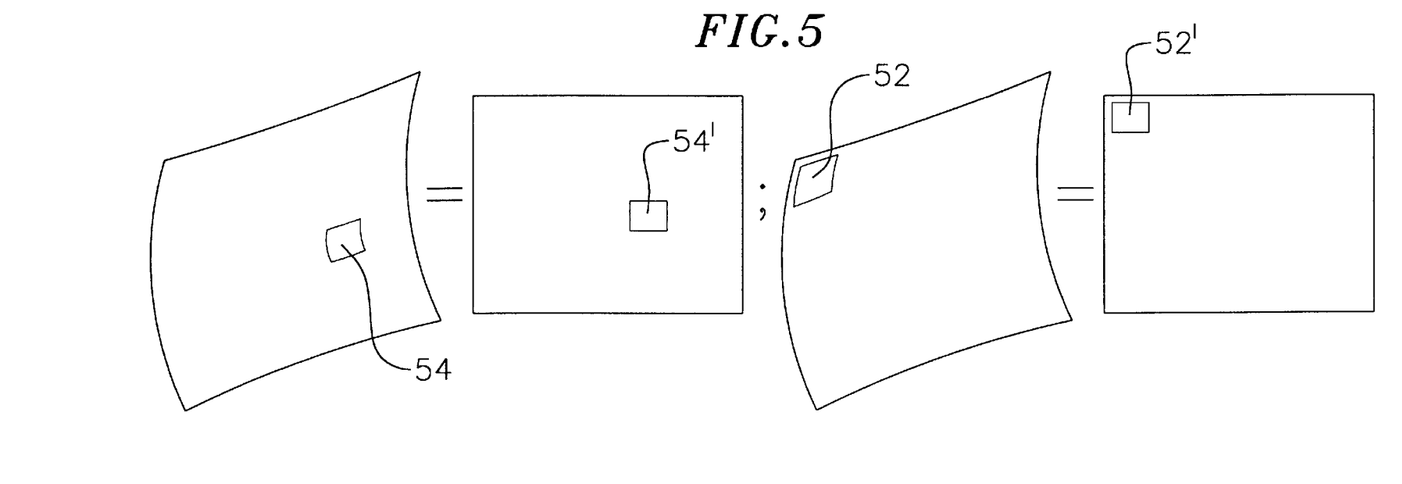
FIG. 5 is a diagram illustrating the operation of the CCD camera analyzer embodiment of FIG. 4.
Figure 6:
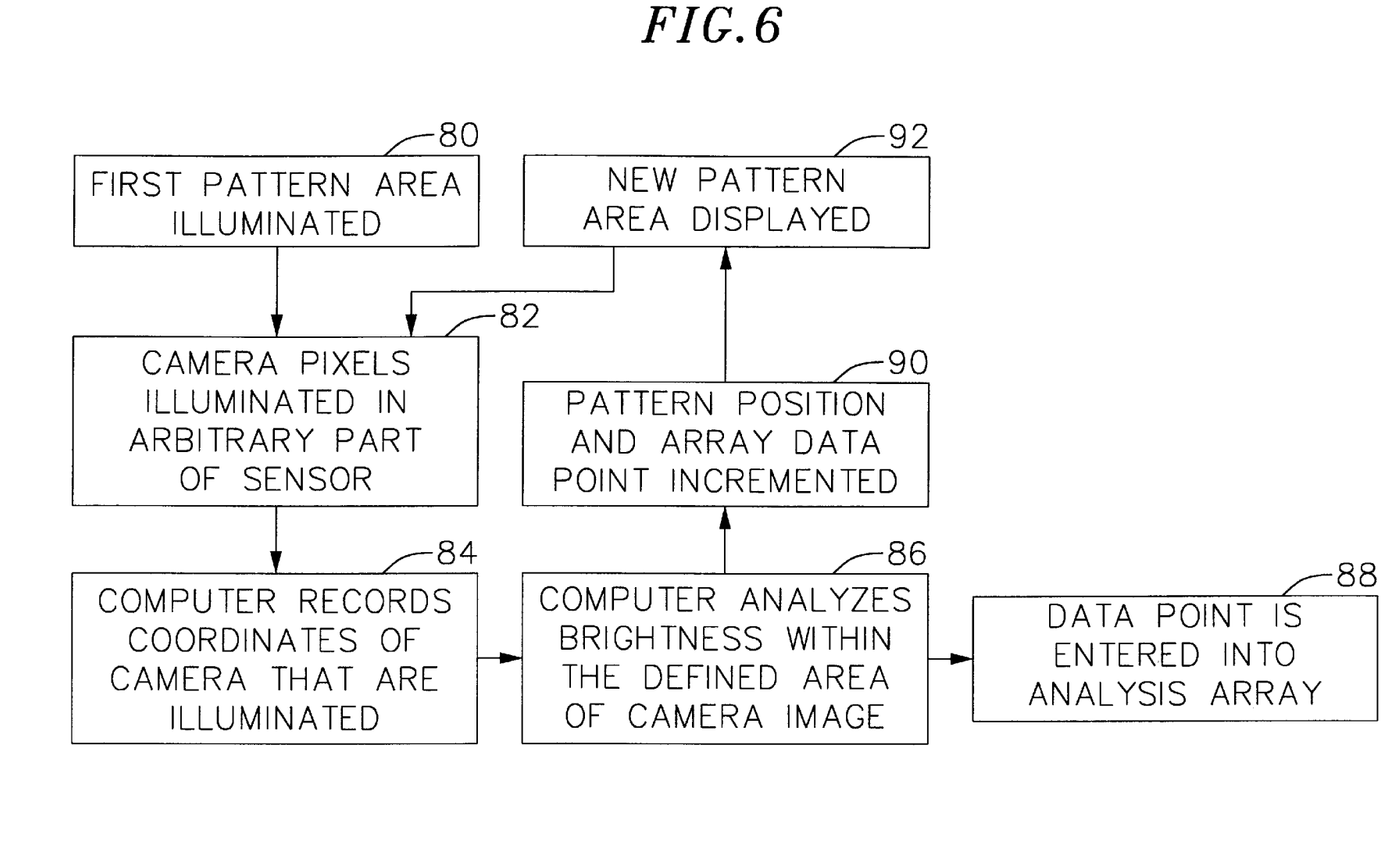
FIG. 6 is a block diagram illustrating the steps of the analysis array generation process using animated pattern areas to map a CCD camera image on to the projected image.

There are several different ways of mapping the camera image on to the projected image in order to create a useful array. In the presently preferred embodiment illustrated in FIGS. 4–6, a control computer 50 sequentially illuminates small portions of the projector image beginning with a first pattern area 52 (block 80, FIG. 6). It creates a sequential animated pattern that steps through all areas (e.g., 54, 56) of the projected image that correspond to the registers of data on the analysis array (block 82, FIG. 6). At the same time the computer is observing the image from the camera and derives its brightness information only from the area of camera pixels illuminated by the pattern showing from the projector. A record of the graphic areas of the camera image are stored that account for and coordinate the camera's image to the registers of the analysis array 52, 52', 54, 54' (FIG. 5) (block 84, FIG. 6). Each small area of the camera's image is thus analyzed and defined as being appropriate to one register in the analysis array (blocks 86, 88, FIG. 6). The control computer then increments the pattern position and array data point (block 90, FIG. 6) and displays a new pattern area (block 92, FIG. 6) until the entire analysis array is generated.

Figure 7:
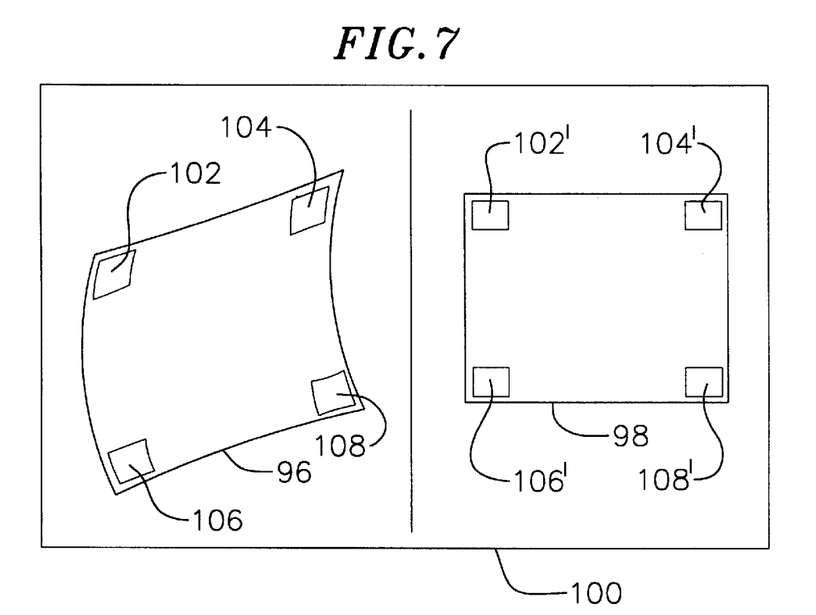
FIG. 7 is a diagram of an alternate embodiment of a system for mapping a CCD camera image on to the projected image.

Referring to FIG. 7, another way of remapping the camera image is to display the camera image 96 and projected image 98 side by side on the computer monitor 100 and manually remap the image. This could be done, for example, by pointing to different parts of the camera image on the computer monitor using a mouse and then clicking on the corresponding point of the projected image. The user would sequentially click on each of the corners of the camera image 102, 104, 106, 108 and corresponding corners of the actual image 102', 104', 106', 108' to coordinate the image that the camera is generating with the actual screen image. Additional corresponding image areas 110, 110' could be marked by clicking on corresponding easily identifiable features of each of the images. In another embodiment, one could draw the outline of the camera image area, and through a morphing program flatten the distorted image out onto the rectangle. In essence, in each case, the system forces a one-to-one correspondence. Each small area of the CCD, which might be as small as a few pixels or less, is eventually coordinated to its appropriate point on a rectangular array. Thus, a distorted image can be read, and a nondistorted analysis array can be derived.

Figure 8:
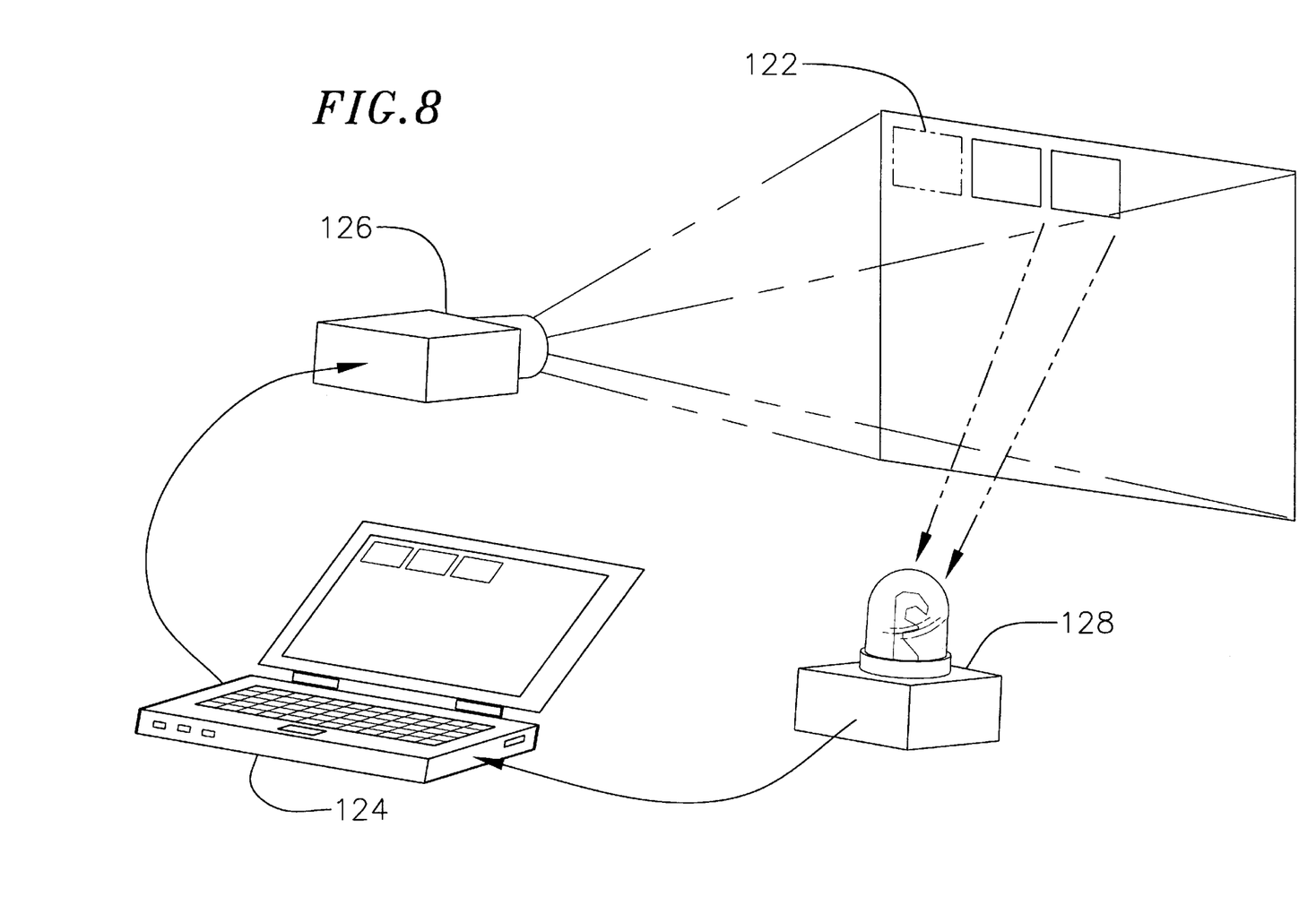
FIG. 8 is a diagram of a system utilizing a photometer to analyze the projected image according to still another embodiment of the present invention.

Referring to FIG. 8, in yet another embodiment of the present invention, a sequence of display patterns 122 generated by a control computer 124 is projected onto the screen by the projector 126. An ultra sensitive photometric device 128 in environmentally dark conditions is directed towards the screen for sampling the display patterns. The size of this sampling area may be the smallest detail element the projector is capable of defining or as large as is desired. The pattern generator used in this application would thus be creating an animated, sequential pattern of pattern areas with the purpose of sequentially illuminating (or depriving of illumination) specific areas of the projected raster in a prescribed sequence, thus appropriately defining desired analysis points for the construction of an analysis array data set.

In this application, the light impinging on the photometer is read directly without imaging, and the x/y coordinates of the test detail point on the imaging raster serve as the indicator of the appropriate position for the resulting data elements to be associated with in the analysis array.

Figure 9:
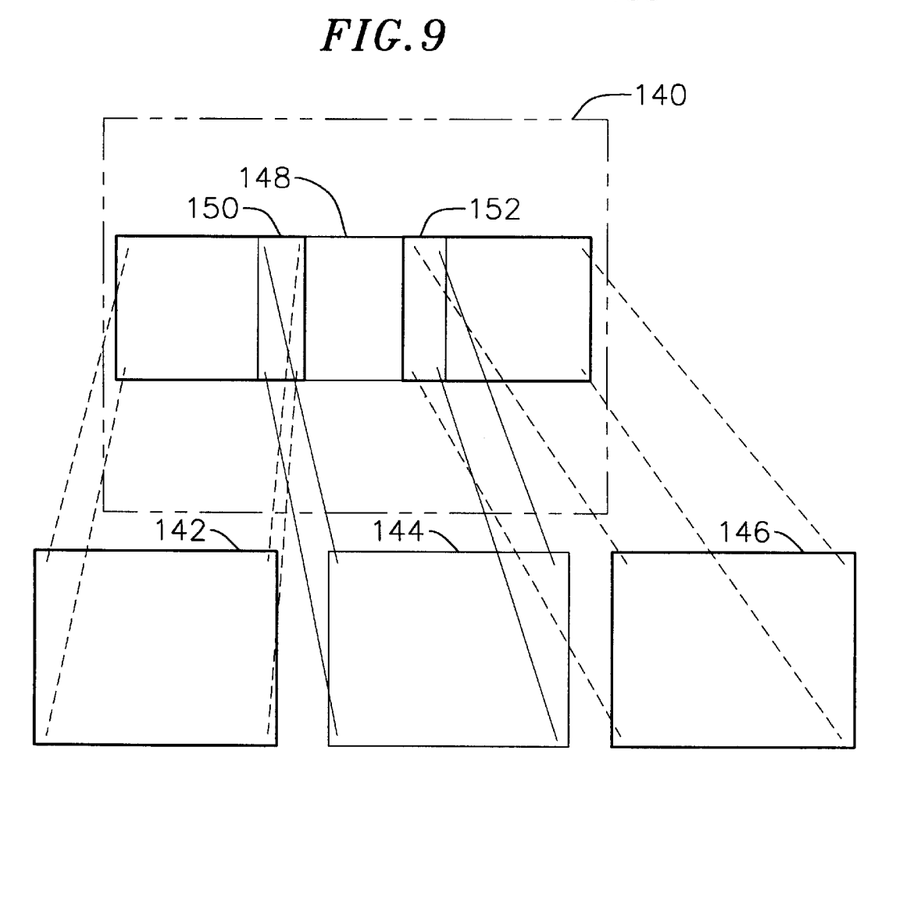
FIG. 9 is diagram of a multiple projector overlapped, blended seamless image display observed by a single CCD camera for purposes of defining analysis arrays for each of the individual projectors.

Referring to FIG. 9, multiple projectors operating as a coordinated array of image components present unique challenges for analysis. Here, the challenge is not just to improve the individual image but to balance the group of projectors to a more closely regulated behavior. Since the projection array's individual elements are portions of a larger image, discrepancies from individual projectors show up as flaws in the overall image. Clearly, the ability to cause all projectors to behave similarly is a very desirable capability.

In this application the individual projector's analysis arrays are coordinated to achieve a common result. To achieve this result an additional form of brightness analysis may be employed. In a presently preferred embodiment, a CCD type array brightness sensor is trained on the full image achieved by the several projectors to create a camera image 140. In this case the individual projectors' images are located within the CCD's sensor array map and identified. Analysis arrays 142, 144, 146 are then generated for each of the projected images.

Individual projectors are analyzed and the least capable projector is determined after all have been optimized by applying the data from each projector's analysis array (block 24; FIG. 1). The remaining projectors are further controlled to match the performance of this "weakest" device. Thus maximum brightness, contrast, gamma, color and tint on all of the projectors will appear identical.

In the case of overlapped, blended image displays 148 from multiple projectors, the data the observing CCD camera's sensors acquire include the overlap regions 150, 152 common to two or more projectors. The data in this area of the image will facilitate the balancing of the brightness manipulations that result in a seamless displayed image. As adjustments in the blended, overlapped region are made, the observing CCD camera provides both empirical data and visual feedback of the adjustment refinement.

After the blended multi-projector image has been achieved, a animated pattern sequence can be displayed as described above with respect to FIG. 4–6 that verifies the performance of the overall image or detects remaining discrepancies in the blended image.

Once constructed, the analysis array is the database upon which an automatic coordination of multiple projector display characteristics may be built. Additionally, the analysis array of a multi-projector, overlapped, blended projections can serve as the database from which automatic projector to projector blending may also be facilitated. Compensation signals can be generated in the form of modified smoothing factors or smoothing curves to affect the incoming source image that is being displayed. Several methods for adjusting the brightness of the images for seamless edge blending are described in U.S. Pat. No. 5,136,390. In one method, an enhanced image is achieved by imposing a layer of smoothing factors over the image source that compensates for the myriad of electronic and physical artifacts that may interfere with the projection system's ability to present evenly illuminated images on screen.

It will be understood by those skilled in the art that the above described embodiments are merely illustrative of circuits that may be used to implement the present invention.

What is claimed is:

1. A system for altering brightness of an arrayed projected image, the arrayed projected image comprising a plurality of projected images, each projected image being generated by one of a plurality of projectors, the system comprising:

means for detecting the arrayed projected image;

means for creating an analysis array including data elements corresponding to the brightness of selected portions of the arrayed projected image; and means for controlling the plurality of projectors as a function of the data elements in the analysis array to alter the brightness of the arrayed projected image, wherein each projected image has red, green and blue color components, and wherein the means for detecting the arrayed projected image comprises:

means for generating a grid pattern comprising individual grid items, each individual grid item identifying a sampling area of the arrayed projected image;

means for projecting the grid pattern onto the arrayed projected image; and means for reading the brightness of the sampling area identified by each grid item.

2. The system of claim 1 wherein the means for reading the brightness of the sampling area comprises a light sensitive metering apparatus having means for measuring the brightness of each color component of the sampling area.

3. A system for altering brightness of an arrayed projected image, the arrayed projected image comprising a plurality of projected images, each projected image being generated by one of a plurality of projectors, the system comprising:

means for detecting the arrayed projected image;

means for creating an analysis array including data elements corresponding to the brightness of selected portions of the arrayed projected image; and means for controlling the plurality of projectors as a function of the data elements in the analysis array to alter the brightness of the arrayed projected image, wherein each projected image has red, green and blue color components, and wherein the means for detecting comprises means for creating a camera image of the arrayed projected image; and the means for creating comprises means for remapping selected portions of the camera image to the analysis array.

4. The system of claim 3 wherein the means for creating a camera image comprises a camera having means for focusing CCD sensors on the arrayed projected image.

5. The system of claim 3 wherein the means for remapping comprises:

means for choosing a portion of the camera image, means for reading the brightness of the chosen portion of the camera image; and means for entering data elements corresponding to the brightness of the chosen portion into a corresponding register on the analysis array.

6. The system of claim 5 wherein the means for choosing comprises a computer having means for displaying the camera image and the arrayed projected image side-by-side on a display, the computer further including means for selecting a part of the camera image and a corresponding part of the displayed arrayed projected image for creating a one-to-one correspondence between the camera image and the arrayed projected image.

7. A system for altering brightness of an arrayed projected image, the arrayed projected image comprising a plurality of projected images, each projected image being generated by one of a plurality of projectors, the system comprising:

means for detecting the arrayed projected image;

means for creating an analysis array including data elements corresponding to the brightness of selected portions of the arrayed projected image; and means for controlling the plurality of projectors as a function of the data elements in the analysis array to alter the brightness of the arrayed projected image, wherein each projected image has red, green and blue color components, and wherein the means for controlling comprises means for creating modified smoothing factors for application to video signals used to generate the projected images of the arrayed projected image.

8. A system for altering brightness of an arrayed projected image, the arrayed projected image comprising a plurality of projected images, each projected image being generated by one of a plurality of projectors, the system comprising:

means for detecting the arrayed projected image;

means for creating an analysis array including data elements corresponding to the brightness of selected portions of the arrayed projected image; and means for controlling the plurality of projectors as a function of the data elements in the analysis array to alter the brightness of the arrayed projected image, wherein each projected image has red, green and blue color components, and wherein the projected images comprise multiple adjoining and overlapping video images produced from multiple projectors, each video image being associated with a separate analysis array, the system further comprising:

means for analyzing the projectors for determining a least capable projector; and means for adjusting the projectors to match performance of the least capable projector thereby creating more uniformity in the performance of the projectors.

9. A system for altering brightness of an arrayed projected image, the arrayed projected image comprising a plurality of projected images, and having a brightness component, the system comprising:

a computer for generating a sequence of display patterns;

a plurality of projectors, each projector for generating one of the projected images, each projected image having red, green and blue color components, the projectors being coupled to the computer for sequentially projecting each display pattern onto the arrayed projected image, each display pattern illuminating a specific area of the arrayed projected image;

a photometric device coupled to the computer for sampling each illuminated area and transmitting data elements corresponding to the brightness on the area to the computer for input into an analysis array; and means coupled to the computer for creating compensation signals to modify the brightness component of the arrayed projected image based on the data elements in the analysis array thereby enhancing the quality and appearance of the arrayed projected image.

10. A method of altering brightness of an arrayed projected image, the method comprising the steps of:

detecting the arrayed projected image, the arrayed projected image comprising a plurality of projected images, each projected image having red, green and blue color components;

creating an analysis array including data elements corresponding to the brightness of selected portions of the arrayed projected image; and controlling a plurality of projectors as a function of the data elements in the analysis array to alter the brightness of the arrayed projected image, wherein the detecting step comprises:

overlaying a grid pattern image comprising individual grid items onto the arrayed projected image, each individual grid item identifying a sampling area of the arrayed projected image;

aligning a light sensitive metering apparatus to each individual grid item; and utilizing the metering apparatus to read the brightness of each sampling area identified by the grid item for input.

11. A method of altering brightness of an arrayed projected image, the method comprising the steps of:

detecting the arrayed projected image, the arrayed projected image comprising a plurality of projected images, each projected image having red, green and blue color components;

creating an analysis array including data elements corresponding to the brightness of selected portions of the arrayed projected image; and controlling a plurality of projectors as a function of the data elements in the analysis array to alter the brightness of the arrayed projected image, wherein the detecting step comprises focusing a sensor on the arrayed projected image for creating a camera image, and the step of creating comprises remapping portions of the camera image to the analysis array.

12. The method of claim 11 wherein the step of remapping comprises:

illuminating an area of the arrayed projected image, the area corresponding to a register on the analysis array;

identifying a corresponding area in the camera image;

associating the area in the camera image to the register on the analysis array; and entering data elements corresponding to the brightness of the area in the camera image into the register.

13. The method of claim 11 wherein the step of remapping comprises:

displaying the camera image and the arrayed projected image side by side on a display;

sequentially selecting a part of the displayed camera image via an input device;

selecting a corresponding part in the displayed arrayed projected image via the input device, the corresponding part being coordinated to a register on the analysis array; and entering data elements corresponding to the brightness of the selected part of the displayed camera image into the register.

14. A method of altering brightness of an arrayed projected image, the method comprising the steps of:

detecting the arrayed projected image, the arrayed projected image comprising a plurality of projected images, each projected image having red, green and blue color components;

creating an analysis array including data elements corresponding to the brightness of selected portions of the arrayed projected image; and controlling a plurality of projectors as a function of the data elements in the analysis array to alter the brightness of the arrayed projected image, wherein the detecting step comprises:

generating a sequence of display patterns;

sequentially projecting each display pattern onto the arrayed projected image, each display pattern illuminating a specific area of the arrayed projected image; and sampling each illuminated area for entering data elements corresponding to the brightness of the area into a corresponding register on the analysis array.

15. A method of altering brightness of an arrayed projected image, the method comprising the steps of:
- detecting the arrayed projected image, the arrayed projected image comprising a plurality of projected images, each projected image having red, green and blue color components;
- creating an analysis array including data elements corresponding to the brightness of selected portions of the arrayed projected image; and
- controlling a plurality of projectors as a function of the data elements in the analysis array to alter the brightness of the arrayed projected image,
- wherein the controlling step comprises creating compensation signals in the form of modified smoothing factors to alter the brightness of the arrayed projected image based on the data elements in the analysis array.

16. A method of altering brightness of an arrayed projected image, the method comprising the steps of:
- detecting the arrayed projected image, the arrayed projected image comprising a plurality of projected images, each projected image having red, green and blue color components;
- creating an analysis array including data elements corresponding to the brightness of selected portions of the arrayed projected image; and
- controlling a plurality of projectors as a function of the data elements in the analysis array to alter the brightness of the arrayed projected image,
- wherein the projected images comprise multiple adjoining and at least partially overlapping video images produced from multiple projectors, each video image being associated with a separate analysis array, the method further comprising the steps of:
    - analyzing the projectors for determining a least capable projector;
    - adjusting the projectors to match performance of the least capable projector thereby creating more uniformity in the performance of the projectors; and
    - creating a composite analysis array of the arrayed projected image to further alter the brightness of the arrayed projected image thereby enhancing the quality and appearance of the arrayed projected image.

17. A method of altering brightness of a projected image, the projected image comprising multiple adjoining and at least partially overlapping video images produced from multiple projectors, the method comprising the steps of:
- (A) detecting the projected image;
- (B) creating an analysis array for each video image including data elements corresponding to the brightness of selected portions of the video image;
- (C) controlling each projector as a function of the data elements in the corresponding analysis array to alter the brightness of the corresponding video image;
- (D) analyzing the projectors for determining a least capable projector; and
- (E) adjusting the projectors to match performance of the least capable projector thereby creating more uniformity in the performance of the projectors.

18. The method of claim 17 further comprising the step of creating a composite analysis array of the projected image after steps (A)–(E) have been performed to further alter the brightness of the projected image thereby enhancing the quality and appearance of the projected image.

* * * * *